United States Patent
Jarman et al.

(10) Patent No.: US 9,390,411 B2
(45) Date of Patent: Jul. 12, 2016

(54) SYSTEM OR METHOD FOR STORING CREDIT ON A VALUE CARD OR CELLULAR PHONE RATHER THAN ACCEPTING COIN CHANGE

(76) Inventors: Murray Jarman, Boynton Beach, FL (US); Shane Jarman, Boynton Beach, FL (US); Regan O'Reilly, Delray Beach, FL (US); Scott Barlow, Agoura Hills, CA (US)

(*) Notice: Subject to any disclaimer, the term of this patent is extended or adjusted under 35 U.S.C. 154(b) by 616 days.

(21) Appl. No.: 13/191,722

(22) Filed: Jul. 27, 2011

(65) Prior Publication Data
US 2013/0026229 A1    Jan. 31, 2013

(51) Int. Cl.
| | |
|---|---|
| *G06Q 20/20* | (2012.01) |
| *G06Q 10/00* | (2012.01) |
| *G06Q 20/32* | (2012.01) |
| *G06Q 20/34* | (2012.01) |
| *G07F 7/08* | (2006.01) |

(52) U.S. Cl.
CPC ............... *G06Q 20/20* (2013.01); *G06Q 10/00* (2013.01); *G06Q 20/204* (2013.01); *G06Q 20/322* (2013.01); *G06Q 20/343* (2013.01); *G07F 7/088* (2013.01); *G07F 7/0893* (2013.01)

(58) Field of Classification Search
CPC ..... G07F 7/1008; G07F 7/1016; G07F 7/127; G06Q 20/341; G06Q 30/0601
USPC ............... 235/492, 487, 462.45, 472.02
See application file for complete search history.

(56) References Cited

U.S. PATENT DOCUMENTS

| | | | |
|---|---|---|---|
| 5,409,092 A * | 4/1995 | Itako et al. | 194/210 |
| 6,594,644 B1 | 7/2003 | Van Dusen | |
| 6,685,551 B2 | 2/2004 | Adams et al. | |
| 7,643,902 B2 * | 1/2010 | Tedesco et al. | 700/237 |
| 7,780,522 B2 * | 8/2010 | Lutnick et al. | 463/25 |
| 2007/0029378 A1 * | 2/2007 | Begola | G06Q 20/204 235/380 |
| 2007/0084909 A1 | 4/2007 | Quattrini et al. | |
| 2007/0094130 A1 * | 4/2007 | Burke | G06Q 20/02 705/39 |
| 2009/0236201 A1 | 9/2009 | Blake et al. | |
| 2009/0271253 A1 | 10/2009 | Arazy et al. | |
| 2011/0047024 A1 | 2/2011 | Anstee | |

* cited by examiner

*Primary Examiner* — Daniel St Cyr
(74) *Attorney, Agent, or Firm* — Clifford H. Kraft

(57) ABSTRACT

A system and method for receiving a value on or associated with a consumer card in lieu of actually receiving coin change. In particular embodiments, and RFID device or other card reader/writer device is connected either in place of, or parallel to, an electric coin dispenser on a Point-of-Sale (POS) terminal or cash register. Instead of receiving an odd amount of coin change after a purchase, the RFID device can augment a total value either stored on the card itself or in an account associated with the card. Alternatively a clerk can cause value to be added to a card equal to the amount that would have given as coin change. A consumer can redeem value up to the amount on the value card at participating stores as if it were a gift card. In one embodiment, a customer ID, total value and optionally a password or PIN can be stored on a smartcard usually in encrypted form. Alternatively, the card or telephone can simply present a barcode which relates to an account. The present invention can either be implemented to work with a particular merchant or merchant chain, or it can be implemented to work across a large number of participating merchants. The latter case usually requires a single remote value account accessible by all the participating merchants.

12 Claims, 4 Drawing Sheets

GIVE-CHANGE COMMAND RECEIVED FROM POS $0.xx
   READ CUSTOMER ID
   READ AMOUNT ALREADY ON CARD
   ADD NEW CHANGE AMOUNT
   WRITE NEW AMOUNT ONTO CARD
RETURN

TAKE VALUE FROM CARD COMMAND FROM POS
   READ AMOUNT ALREADY ON CARD
   READ CUSTOMER ID
   SUBTRACT CURRENT VALUE BEING USED
   IS RESULT LESS THAN ZERO?
     IF YES, RETURN ERROR
   WRITE NEW AMOUNT ONTO CARD
RETURN

FIG. 4

SYSTEM OR METHOD FOR STORING CREDIT ON A VALUE CARD OR CELLULAR PHONE RATHER THAN ACCEPTING COIN CHANGE

BACKGROUND

1. Field of the Invention

The present invention relates generally to storing credit on a value card, gift card, smartcard or cellular phone and more particularly to a system and method for putting credit on such a card or phone rather than accepting coin change from a coin dispenser or clerk.

2. Description of the Prior Art

Over 354 billion cash transactions for less than $5 occur per year in the USA. Nearly all of these involve the nearly worthless currency that a cashier fumbles to get out of a drawer or that a change dispenser dispenses. The customer many times loses the change or really doesn't care about it. In fact, it can be a nuisance. The businesses that are required to give change are hassled with continuously having to restock numerous pennies, nickels, dimes and quarters.

Value cards, gift cards, smartcards and cellular phones are known in the art. Numerous cards can store value either directly on the card or through an associated account. Also known in the art is a coin change dispenser attached to a cash register or Point-of-Sale (POS) terminal. Various companies manufacture such coin change dispensers under names such as T-Flex and Transact2+.

It would be very advantageous to have a system and method for putting coin change value from a POS terminal, cash register or clerk onto a value card or cellular phone rather than actually receiving coins.

Older coin dispensers were completely mechanical with at most a relay control line, modern devices designed for electronic cash registers and POS terminals use a serial signal line usually under the electrical standard known as RS-232 or RS232C. In these electronic systems, a serial data signal is sent from the cash register to the coin dispenser when a clerk enters the amount rendered by the customer and closes the transaction. The total amount of change due the customer appears on the POS screen, and the clerk gives the larger change in bills. Upon the push of a button on the POS terminal, a serial data signal is sent to the coin dispenser containing the remaining amount of change to give and a command to dispense it. The coin dispenser usually contains a microprocessor that then translates this into quarters, dimes, nickels and pennies to operate relays or solenoids on coin chutes. Some systems can even realize that a particular chute is empty and sometimes substitute other coins (for example if the dimes chute is empty, the device may be able to dispense two nickels instead).

U.S. published Patent Application number 2007/0084909 teaches a modern versions of a coin-dispenser.

U.S. Pat. No. 6,685,551 shows the type of coin dispenser typically found at POS terminals.

In addition, there are many types of value cards in use today. Some are specialized to certain businesses, such as coffee cards, copier cards, telephone cards and the like, while others can be used universally. Sometimes these cards contain the value directly on the card (such as copier cards). This type of card can many times be re-charged simply by adding value to it either directly at a retail outlet or online with a credit card. Other times, the card simply relates to an account kept on a server or remote computer. Some of these cards only have magnetic strips, while others have micro-controllers on them.

Cards that contain actual value may or may not have protection against theft or loss. Most simple cards like copier cards do not; more sophisticated smart cards my have encrypted data or a key mechanism stored on the card that prevents unauthorized use.

As previously stated, receiving money change in the form of coins is also sometimes a nuisance since coins cannot be cleared through metal detectors, often they accumulate in piggy banks, jars or other collecting devices until they have to be deposited in a bank. But, then without counting devices, the coins have to be bundled then turned into a bank or other savings institution. Also, frequently coins are simply lost.

It would be very advantageous to have a system and method for putting coin change from a POS terminal, cash register or clerk onto a value card or cellular phone rather than actually receiving coins. This would have a double advantage: 1) the user (and especially the traveler) would be relieved of having to carry pockets of loose change; and 2) the card could be an incentive to return to a particular store to redeem the stored value.

SUMMARY OF THE INVENTION

The present invention relates to a system and method for receiving a value on or associated with a consumer card in lieu of actually receiving coin change. In particular embodiments, an RFID device or other card reader/writer device can be connected either in place of, or in parallel with, an electric coin dispenser on a Point-of-Sale (POS) terminal or cash register to put value on the card instead of receiving an odd amount of coin change after a purchase. Alternatively, a simple card reader/writer can be used by a clerk to put the value on the card. The RFID device can augment a total value either stored directly on the card itself or in an account associated with the card. A consumer can later redeem value up to the amount on the card at participating stores as if it were a value card. Optionally, the accrued value can be added to a credit card or returned as award points or the like. In one embodiment, a customer ID, total value and optionally a password or PIN can be stored on a smartcard usually in encrypted form. The RFID device, or other reader, can read this information and can modify the total value upon command from the POS terminal, cash register or by command entered by a clerk.

The present invention can either be implemented to work with a particular merchant or merchant chain, or it can be implemented to work across a large number of participating merchants. The latter case usually requires a single remote value account accessible by all the participating merchants. Instead of a smartcard, it is also contemplated that a cellular phone, smartphone or computer can accumulate and store the coin change. Thus, if a person wants to accumulate and store the coin change, on a particular account, the phone or computer can be used to accumulate and display such information which can then be available to download a value for a subsequent purchase. A user of the present invention does not need to worry about breaking change. For example, if the user pays $3.00 for an item that costs $2.01, the user knows that the 99 cents change will not go to waste or be jingling around in a pocket or purse; it will be added to a simple-to-redeem value card.

A particular embodiment of the present invention simply uses a barcode which can be on a small plastic key chain card or other card. In this case, the barcode is read by a reader, and the coin change value is added to an account kept by the merchant or a central account.

DESCRIPTION OF THE FIGURES

Attention is now directed to several drawings that illustrate features of the present invention:

FIG. 4 shows a set of steps followed by some embodiments of the present invention.

Several illustrations and drawings have been presented to aid in understanding the present invention. The scope of the present invention is not limited to what is shown in the figures.

DESCRIPTION OF A PREFERRED EMBODIMENT

The present invention relates to a system and method of adding value to a card (or an account) instead of taking coin change from a POS terminal of cash register.

Figure 1:
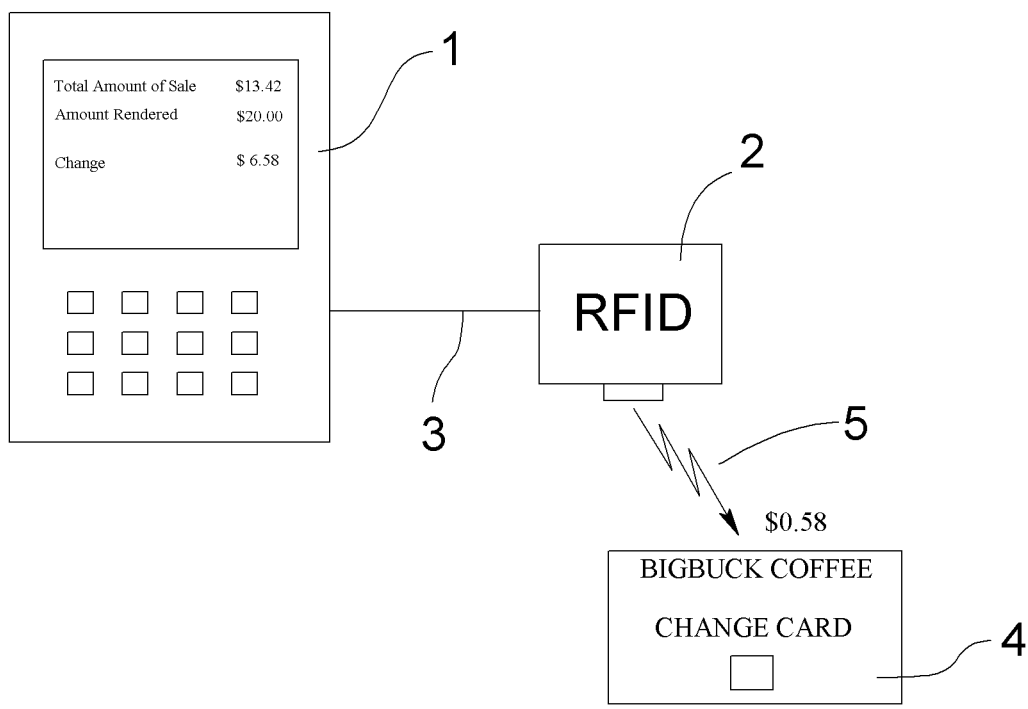
FIG. 1 shows a block diagram of an embodiment of the present invention.

Turning to FIG. 1, a block diagram of an embodiment of the present invention can be seen. A POS terminal 1 communicates with an RFID reader/writer unit 2 using an RS-232 link 3 or any other communications technique between the POS terminal and another device. While wires are shown in FIG. 1, the link can be wireless using any known wireless technique including IR, a dedicated radio link, WiFi, BLUETOOTH. Any communication technique is within the scope of the present invention. While the RFID device 2 is shown in proximity to the POS terminal 1 in FIG. 1, the RFID device 2 may be remote in some embodiments of the invention.

As shown in FIG. 1, a customer has been charged $13.42 from an item or service. A 20 dollar bill has been rendered to the clerk, and the POS terminal states that the total change is $6.58. The clerk will hand the customer $6.00 in paper money and press a button that sends a signal to the RFID device 2 that $0.58 is owed the customer (or this information can be sent automatically). A customer number can also be sent to the RFID device 2.

At this point, the RFID device 2 can wait until the customer or the clerk brings a smartcard 4 near the RFID device 2. The first interrogation and response can read the customer ID from the smartcard 4. Next, the RFID device 2 can read the current total amount on the customer's smartcard 4. $0.58 can be added to that total, and the new total can be written back onto the smartcard 4.

If, for some reason, the customer fails to bring his or her card near the RFID device 2, or if the card cannot be read, the RFID device 2 can timeout after a predetermined period and forget the transaction. This period can vary, but a preferred timeout is in about 5 minutes. The clerk at the POS terminal 1 can also have the option to dispense actual coin change in the case that the customer changes his or her mind, or the smartcard 4 does not work for some reason.

In the case that the customer wishes to redeem value from the card, the clerk can be so-advised (usually to pay for an item or service), the customer can bring the card 4 near the RFID device 2, and a similar procedure can be followed, except that the desired amount is subtracted from the card 4. If there is not enough value on the card for the desired purchase, the RFID device 2 can return an error.

To provide greater security, the information on the smartcard 4 may be encrypted. Also, an electronic signature might be required in the case of value redemption. In one particular embodiment, the customer ID and total value are both encrypted with merchant's public key. This information can only be decrypted with the merchant's private key which is stored securely in the RFID device 4 or the POS terminal 1. This has a weakness that a hacker knowing the merchant's public key can alter the value on the card. Alternatively, the information may be encrypted and decrypted with a single key known only to the merchant. This is the most secure technique, and prevents unauthorized value addition to the card. These methods do not cover the case of a lost card. Use of a lost or stolen card can be prevented by also storing an optional encrypted user password or PIN on the card. To redeem value, the user would be required to enter this password or PIN on a keyboard. The use of a key known only to the merchant has the disadvantage of the card only working for one merchant.

While FIG. 1 shows a smartcard 4, the system and method of the present invention can also work with an account stored on a server or other computer or on a cellular telephone or smartphone. In this case, the customer's card contains only a customer ID number. The actual value is stored remotely. This embodiment has the advantage of a much simpler (common plastic) card with a swipe strip and very little security. However, it can only be used with one merchant (the one who maintains the account). Embodiments of the present invention that use smartcards can be used across different participating merchants.

Figure 2:
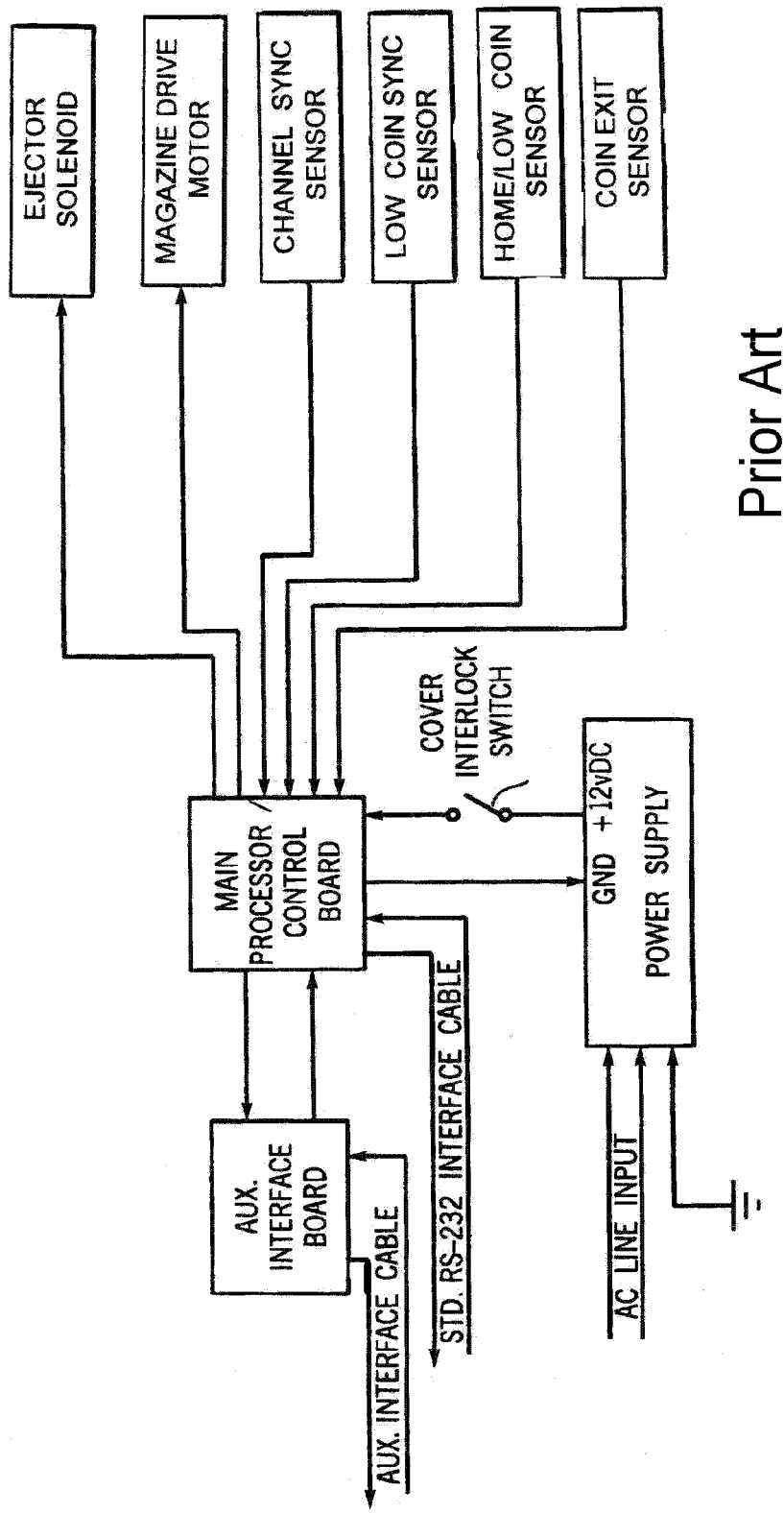
FIG. 2 shows an electronic diagram of a prior art coin dispenser.

FIG. 2 shows a block diagram of a prior art coin dispenser (taken from U.S. Pat. No. 6,685,551). As can be seen, an RS-232 signaling interface drives a processor that in turn controls various solenoids, motors and reads various sensors to control the dispensing of coins.

Figure 3:
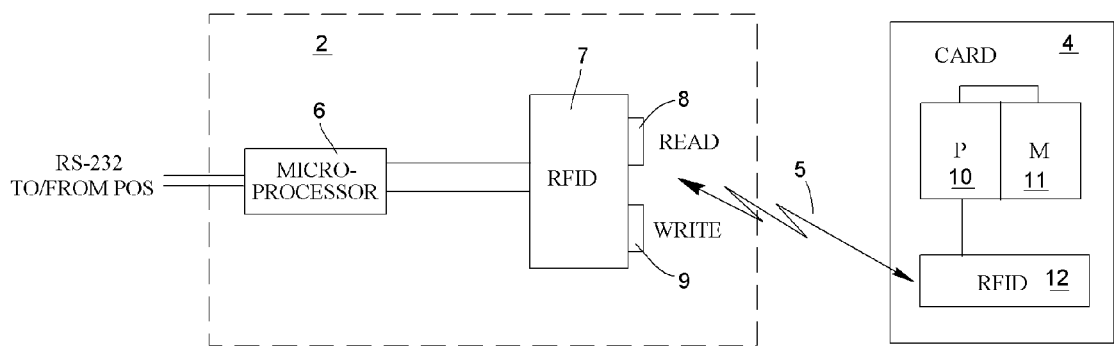
FIG. 3 shows a electronic diagram of an embodiment of the present invention.

FIG. 3 shows a block diagram of an RFID unit 2 according to the present invention that can replace the coin dispenser of FIG. 2 (or operate in parallel with it). The RS-232, or other signaling interface, supplies signals into the unit from the POS terminal or cash register exactly as in the prior art unit of FIG. 2. A processor 6 is coupled to an RFID head 7 that has a read port 8 and a write port 9. A smartcard 4 contains a similar (however miniaturized) RFID head 12 as well as a microcontroller 10 or other processor and a non-volatile memory 12. The card usually also contains a battery or other power source (not shown). Some RFID tags operate without batteries deriving energy to operate from the interrogation signal. This type of device is within the scope of the present invention. The card's memory 11 can contain a customer ID and a current value total. As stated, this information can be optionally encrypted. When it is encrypted, the card should not contain any cryptographic keys.

As stated, a particular embodiment of the present invention uses a barcode. The barcode can be carried by a consumer on a key chain or on a small card like a credit card or other device, or it could be displayed on the screen of a cellular telephone or smartphone. Instead of receiving coin change, the consumer can simply scan the barcode past a barcode reader (or alternatively hand the card containing the barcode to the clerk for scanning). A stored account can then be augmented. To redeem, the barcode can be scanned to pay for a purchased item or service up to whatever amount is in the account.

FIG. 4 shows an example of a set of processor steps that the RFID device 4 can perform. When it reads a command to give change, it typically also receives a money value between $0.01 and $0.99 and a customer ID number of the customer who should receive this amount. The device continuously interrogates looking for another RFID head in its swipe area. When it reads a nearby card, it normally receives the customer ID number on the card. If this ID number matches any of the current customer ID numbers it has been commanded to service, it will then read the current value total from the card (by again interrogating and waiting for a response). The commanded amount is then added to the total, and the total written back to the card.

When value is to be retrieved from the card, a similar process can occur. A command from the POS specifies a particular value to be taken from a particular customer card. When a card is sensed, the customer ID is read, and if it matches, the current total value on the card. If the request is for more than the amount on the card, the RFID device can return an error. If not, then the value can be subtracted and placed back on the card.

The present invention provides a way for consumers to avoid receiving and carrying change when paying cash and yet, receiving credit for their change. Equivalent value for coin change can be stored on a card or in a remote account. In one embodiment, the change amount can be credited to a credit or debit card account as either cash or reward points. In another embodiment, the change amount can result in frequent-flyer miles or can be donated to a consumer's charity.

This description of the present embodiment has referred to an RFID device. This is not limited to simple RFID tag readers or writers. An RFID device can be any wireless device or method for reading or writing another device or card or it can be an interface to a cellular telephone or smartphone either local or remote or an interface to any other type of storage device. It can also be a simple barcode that is read by a barcode reader.

When embodiments of the present invention are used with a single merchant or merchant chain, the POS system or the merchant should maintain an offline account of all value that is added to cards (rather than being dispensed as coin). Redemptions should be subtracted from this account. Generally, this account can be updated on a daily basis or in real-time.

When embodiments of the present invention are used across a number of different participating merchants or merchant chains, a central value account is usually required so equivalent coin value can be added to the account and redemptions can be subtracted from the account. Participating merchants would have to pay into the account the actual amount that would have been dispensed in the form of coin, and merchants honoring redemptions could withdraw the redeemed value from the account.

Several descriptions and illustrations have been provided to aid in understanding the claimed invention. One with skill in the art will realize that numerous changes and additions can be made from these embodiments of the invention without departing from the spirit of the invention as claimed. Each of these changes and variations are intended to be within the scope of the present invention.

We claim:

1. A system for collecting coin change from purchased transactions and for redeeming the coin collected, the system comprising storing information relating to a plurality of storage devices in a data base; providing each user with a storage device; reading the user storage device at a point of purchase; verifying the user device through an electronic signature or a PIN; automatically storing the coin portion of the change due to the user in the storage device; returning the bill portion of change to the user, wherein the user can redeem the stored amount by paying for purchased items or withdraw coinless amounts from the storage device.

2. The system of claim 1 wherein said user storage device is a smartcard.

3. The system of claim 1 wherein said user storage device is a smartphone.

4. The system of claim 3 wherein said smartphone presents a barcode as said electronic signature.

5. The system of claim 1 wherein said reading of the user storage device at the point of purchase is done wirelessly.

6. The system of claim 1 wherein said total value is encrypted on said user storage device.

7. A system for collecting coin change from purchased transactions and for redeeming the coin collected, the system consisting of: storing a plurality of storage devices in a data base; providing each user with a storage device; reading the user storage device at a point of purchase; verifying the user device through an electronic signature or a PIN; automatically storing the coin portion of the change due to the user in the storage device; returning the bill portion of change to the user, wherein the user can redeem the collection amount by paying for purchased items or withdraw coinless amounts from the storage device.

8. The system of claim 7 wherein said user storage device is a smartcard.

9. The system of claim 7 wherein said user storage device is a smartphone.

10. The system of claim 9 wherein said smartphone presents a barcode as said electronic signature.

11. The system of claim 7 wherein said reading of the user storage device at the point of purchase is done wirelessly.

12. The system of claim 7 wherein said total value is encrypted on said user storage device.

* * * * *